United States Patent
Lehmann

(10) Patent No.: US 6,446,493 B1
(45) Date of Patent: Sep. 10, 2002

(54) CONTAINER TIGHTNESS TESTER

(76) Inventor: Martin Lehmann, Obere Farnbühlstr. 1, 5610 Wohlen (CH)

( * ) Notice: Subject to any disclaimer, the term of this patent is extended or adjusted under 35 U.S.C. 154(b) by 0 days.

(21) Appl. No.: 10/050,155

(22) Filed: Jan. 18, 2002

Related U.S. Application Data

(62) Division of application No. 09/691,217, filed on Oct. 19, 2000, now Pat. No. 6,345,527, which is a division of application No. 08/944,471, filed on Oct. 6, 1997, now Pat. No. 6,167,750.

(30) Foreign Application Priority Data

Jul. 5, 1997 (EP) .............................. 97107520

(51) Int. Cl.[7] .............................. G01M 3/16; G01M 3/36
(52) U.S. Cl. .............................. 73/49.3; 73/49.2; 73/52; 73/45.4
(58) Field of Search ................. 73/49.3, 49.2, 73/52, 45.4, 40

(56) References Cited

U.S. PATENT DOCUMENTS

| | | | |
|---|---|---|---|
| 3,751,972 A | * 8/1973 | Hass | 73/45.4 |
| 3,847,013 A | 11/1974 | Luy | 73/40.7 |
| 3,859,844 A | * 1/1975 | Hruby | 73/45.4 |
| 4,803,868 A | 2/1989 | Vinton et al. | 73/49.3 |
| 4,901,558 A | 2/1990 | Leining et al. | 73/49.3 |
| 4,949,076 A | * 8/1990 | Wann | 340/605 |
| 5,239,859 A | 8/1993 | Lehmann | 73/49.2 |
| 5,365,774 A | 11/1994 | Horlacher | 73/49.3 |
| 5,373,729 A | 12/1994 | Seigot | 73/49.3 |
| 5,513,516 A | 5/1996 | Stauffer | 73/49.2 |
| 5,542,288 A | 8/1996 | Fenlon | 73/49.3 |
| 5,728,940 A | 3/1998 | Kim et al. | 73/40.7 |
| 5,773,711 A | 6/1998 | Itoh et al. | 73/52 |
| 5,915,270 A | 6/1999 | Lehmann | 73/49.2 |
| 5,918,270 A | 6/1999 | Heuft | 73/45.4 |
| 5,962,776 A | 10/1999 | Lehmann | 73/49.3 |
| 6,029,503 A | 2/2000 | Sumioki | 73/40 |
| 6,167,750 B1 | 1/2001 | Lehmann | 73/49.3 |

FOREIGN PATENT DOCUMENTS

| | | |
|---|---|---|
| EP | 0 278 503 | 8/1988 |
| WO | 94-05991 | 3/1994 |

* cited by examiner

Primary Examiner—Hezron Williams
Assistant Examiner—David J. Wiggins
(74) Attorney, Agent, or Firm—Antonelli, Terry, Stout & Kraus, LLP

(57) ABSTRACT

For tightness testers with a plurality of in-line test stations (1) on a conveyor it is proposed to supply the tightness-relevant measurement signals from the chambers by detecting pressure change measurements via pressure sensors or electrical impedance measurements via electrodes that occur at the test stations over a time interval. The signals are supplied through multiplexers (5) to a central evaluation (9).

8 Claims, 2 Drawing Sheets

CONTAINER TIGHTNESS TESTER

CROSS-REFERENCE TO RELATED APPLICATIONS

This application is a Divisional application of U.S. application Ser. No. 09/691,217, filed Oct. 19, 2000, now U.S. Pat. No. 6,345,527, which in turn is a Divisional Application of U.S. application Ser. No. 08/944,471, filed Oct. 6, 1997, now U.S. Pat. No. 6,167,750, issued Jan. 2, 2001.

TECHNICAL FIELD

The present invention relates to a container tightness tester with a conveyor and with a plurality of test stations, each for at least one container, with at least one pressure sensor at each test station, which is operationally connected on the output side with the input of an evaluation unit.

BACKGROUND

Testers of the above type are known in which, as viewed on the carousel, the respective test stations are pressurized in a first rotation angle position of the carousel, in the case of open containers, their interiors, or in the case of closed containers, corresponding test chambers at the test station, and in which the pressure that depends on the tightness of the container under test is detected in at least one additional predetermined rotation angle position of the carousel and then evaluated. This known method and/or this type of tester are disadvantageous for a number of reasons. Because pressure detection is performed by the individual test chamber while passing through a certain rotation angle, generally for example a certain position for linear conveyors, only a limited time is available for pressure measurement, as a function of the rotational speed or of the speed in general, and hence of the throughput rate. This limits the rate at which containers can be tested per unit time and is especially problematic in continuous carousel operation. In addition, it is not possible to follow over time the pressure that depends on leakage because the pressure sensors provided perform their measurements only at certain times.

Systems for extremely reliable tightness testing therefore have at least one pressure measurement sensor permanently associated with each of the test stations that go around with the carousel, as well as likewise permanently assigned evaluation electronics that allow testing to be performed at the test stations freely throughout the entire time interval, during which a container loaded into a test station on the carousel goes around with the carousel.

This latter procedure and/or the corresponding systems admittedly have an extremely high detection accuracy but they are also correspondingly expensive in that they are autonomous as mentioned above, with each test station being equipped with the necessary evaluation electronics.

SUMMARY OF THE INVENTION

The goal of the present invention is to provide a container tightness tester of the species recited at the outset in which, on the one hand, the detection accuracy with respect to the latter systems is reduced only insignificantly if at all, but this can be accomplished at a much lower expense. For this purpose, the system of the species recited at the outset is characterized by a common evaluation unit provided for several of the pressure sensors and, in addition, a multiplexer unit clocked by a timer is connected between one input of the common evaluation unit and the outputs of pressure sensors.

In testing the tightness of filled containers, especially those filled with a liquid filling, as described in detail in the additional U.S. application Ser. No. 08/944,183, now U.S. Pat. No. 5,962,776, issued Oct. 5, 1999, filed at the same time as the present application (a copy of which application was filed herewith as Attachment A), there is the problem that when there is a vacuum in the vicinity of the container, it is difficult to detect a leak in the parts of the wall that are contacted by the liquid filling. The liquid that escapes to the outside in this case has a practically self-sealing effect. A reliable tightness test for such containers is only guaranteed if a leak occurs in a wall area opposite an air inclusion inside the container. For this reason, in the abovementioned application (Attachment A) filed at the same time it is proposed simultaneously with testing of tightness by observing the pressure in the environment of the container, to perform an impedance measurement directly at the wall of the container, in view of the fact that escaping liquid immediately causes a change in impedance at a measurement point located between at least one pair of measuring electrodes.

With this in mind, it is now proposed to provide at least one pair of electrodes in a receiving chamber for at least one container when testing containers filled with liquid filling, said electrodes being spaced and exposed and provided centrally for all test stations, and connected operationally in turn by a multiplexer unit with the respective electrode pairs. This makes it possible to provide both an evaluation unit for pressure-detecting testing as well as an evaluation unit for central impedance detection testing for all the test stations provided on the carousel and to multiplex the respective pressure sensor and impedance measurement section outputs on a time-staggered basis to the corresponding evaluation units over time.

In another preferred embodiment of the evaluation unit that is connected to the electrodes and the evaluation unit that is operationally connected with the pressure sensors, one and the same central evaluation unit is used. This is readily possible in that pressure sensors usually deliver a voltage signal, especially during DC resistance measurement as impedance measurement. A measurement circuit equipped with the variable resistance to be measured, such as a voltage divider, can likewise be readily designed so that the resistance-dependent output signal is a voltage signal. By virtue of this procedure, the cost of simultaneous pressure and impedance testing is especially low.

The possibility is also provided for implementing the multiplexer units connected between the impedance measurement sections and the evaluation unit on the one hand and the multiplexer units provided between the pressure sensors and the evaluation unit on the other hand by a single common correspondingly time-controlled multiplexer unit, which switches the number of inputs that corresponds to the pressure sensor and impedance measurement sections to a single output for the central evaluation unit provided.

In WO94/05991 of the same applicant, as the present application, a pressure tightness measurement method is explained in detail in which the output from a pressure sensor is connected at a first point in time to both outputs of a differential unit. The possibly amplified output signal from the differential unit is interpreted as a zero-offset signal and stored. During pressure detection at a second point in time, the previously stored zero-offset signal is connected as a zero-compensation signal making it possible with high amplification to evaluate the corresponding pressure differential-signal electrically.

This procedure can also be used in the system according to the present invention, with the evaluation unit being so designed that an input signal-dependent signal that appears at the first point in time is stored as the zero-reference signal value and later supplied as the zero compensation signal. At a second, subsequent point in time, an additional input-dependent signal, possibly amplified, is evaluated as the evaluation signal relative to the compensated zero value as a differential. This procedure can be used for both evaluations when pressure sensor evaluation and impedance evaluation are present at the same time, since, as far as impedance measurement is concerned as well, which after all depends on an impedance difference measurement, the impedance difference that arises can occur with reference to the exact compensated zero reference.

The invention will now be described using the figures as examples.

DETAILED DESCRIPTION OF EMBODIMENTS

Figure 1:
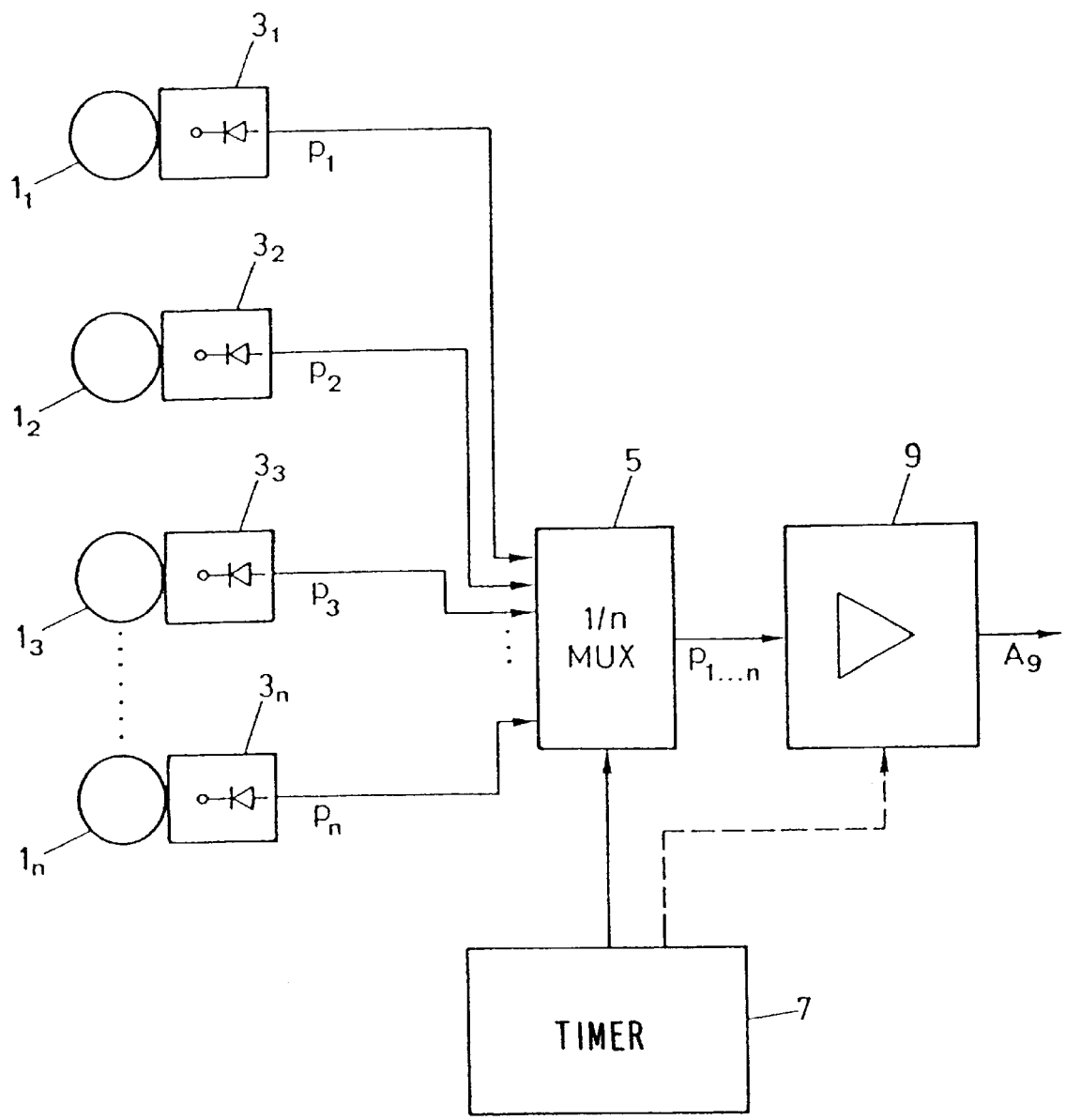
FIG. 1 is a signal flow/functional block diagram of a container tightness tester according to the invention in which the tightness test is performed on the basis of a pressure measurement at the respective test stations.

According to FIG. 1, on a carousel (not shown), a plurality of test stations, n for example, $1_1, 1_2, \ldots 1_n$ is provided. They are arranged linearly in the figure for the sake of simplicity and on the carousel they are arranged along the periphery of the carousel.

Each test station 1 has at least one corresponding pressure sensor $3_1, 3_2, 3_3, \ldots, 3_n$ associated with it. Pressure sensors $3_x$ each deliver an electrical signal, correspondingly $p_1$ to $p_n$, that depends on the leakage in at least one container located in the respective test station 1.

Stations $1_x$ and the pressure sensors $3_x$ associated with them can be the following stations:

a) Holding stations for tight sealing of open containers, at which an internal pressure, overpressure, or vacuum is provided relative to the ambient pressure. The associated pressure sensor in this case measures the leak-dependent internal pressure of such a container.

b) Closed containers are placed in a tightness-testing chamber at station $1_x$ or are closed in a sealing fashion by the latter, with the containers being full or empty. A pressure differential is created between the interior of the container and the surrounding chamber space, by either a vacuum or a positive pressure being applied to the interior of the container and/or pressure or a vacuum being applied to the ambient pressure space. The is evaluassociated pressure sensor measures the pressure curve inside the container or in the test chamber. This procedure is usually employed for closed, filled containers. The test chamber is subjected to a vacuum, based on the internal pressure of the container, and the pressure buildup in the chamber space surrounding the container is recorded using the associated pressure sensor.

According to FIG. 1, the electrical outputs of sensors $3_x$ are connected to a multiplexer unit 5 which, controlled by a timer 7, sequentially connects one pressure sensor after the other to an evaluation unit 9, corresponding to signals $p_1 \ldots n$. At evaluation unit 9, each connected leak-dependent signal $p_1$ to $p_n$ is evaluated sequentially and output $A_9$ gives a reading corresponding to the preset threshold values for these signals, which shows in which of stations $1_x$ a container found to be leaking is located. Of course, a comparator unit is provided for this purpose on evaluation unit 9, said comparator unit having the threshold value input into it for the selection leaking/not leaking and a storage unit can be connected on the output side of the comparator unit for recording those test stations whose sensor output signals indicate leakage of the containers inside them.

In this manner, a situation is created such that a number of test stations that corresponds to the size of the carousel, each with a corresponding pressure sensor, can be handled by a single evaluation unit.

As mentioned at the outset, especially when containers filled with a liquid filling are tested for tightness according to the principle described briefly above under b), and as explained in detail in the simultaneously submitted application Ser. No. 08/944,183, now U.S. Pat. No. 5,962,776, issued Oct. 5, 1999, (Attachment A) of this applicant, problems arise that can be eliminated by simultaneous pressure and impedance evaluation, directly outside the container.

Figure 2:
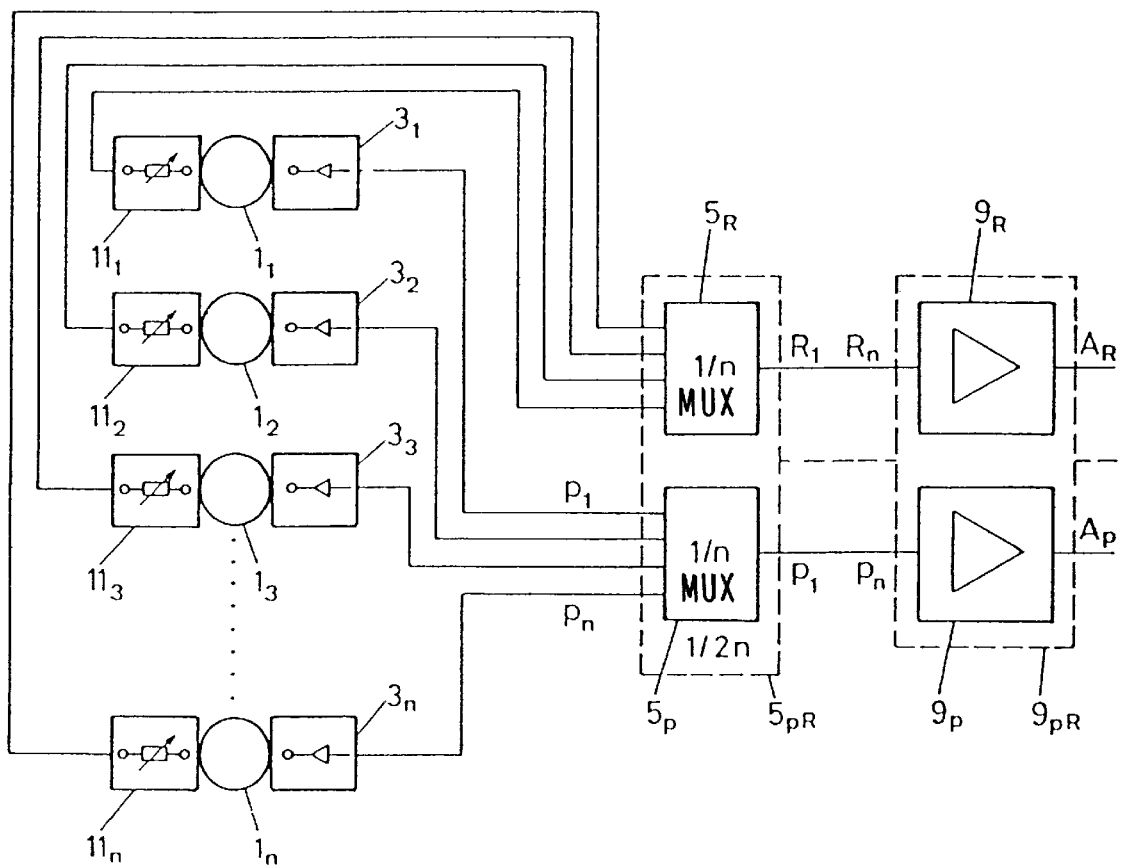
FIG. 2 in a diagram similar to that in FIG. 1 shows the improvement in the system according to the invention for tightness testing using both pressure and impedance measurements.

In FIG. 2 of the invention according to the present application, a system suitable for the purpose analogous to the one in FIG. 1 is shown schematically. Accordingly, each of test chambers $1_1$ to $1_n$ in addition to at least one pressure sensor $3_1$ to $3_n$ has an impedance measurement section with at least two electrodes, shown schematically in FIG. 2 by $11_1$ to $11_n$. Using the impedance measurement sections containing at least two tapping electrodes in the test chambers of test stations $1_x$, located directly on the outside wall of the individual containers to be tested, a determination is made whether liquid filling is escaping to the outside through a provided leak, said filling being driven outward by a vacuum created in the test chamber relative to the pressure inside the container.

According to the principle in FIG. 1, the electrical outputs with signals $p_1$ to $p_n$ are connected to multiplexer unit $5_p$, while the outputs of impedance measurement sections $11_x$ are connected to another multiplexer unit $5_R$. The outputs with signals $p_1$ to $p_n$ and $R_1$ to $R_n$ according to FIG. 2 are connected to their respective evaluation units $9_R$ and $9_p$. Again, in sequence, the signals connected at the individual evaluation units are measured at a predetermined threshold value and then an output signal $A_R$ or $A_p$ is output that indicates the chambers 1 in which a container found to be leaking is located. If leakage-identifying signals are picked up with this system configuration at one of the two evaluation units, i.e. for pressure and/or for impedance, the corresponding container is determined to be leaking and the corresponding chamber number is stored.

Impedance measurement is usually performed as DC resistance measurement. Because pressure sensors normally deliver a voltage signal that depends on the detected pressure, and it is readily possible to perform a resistance measurement such that the resistance-dependent signal is a voltage signal, as shown by the dashed lines in FIG. 2, in another preferred embodiment, in addition to a single multiplexer $5_{pR}$ a single evaluation unit $9_{pR}$ is provided in particular, with multiplexer $5_{pR}$ being connected by a single output to the input of evaluation unit $9_{pR}$ provided. A timer unit (not shown here) switches to the combined evaluation unit depending on whether a pressure-measurement signal or a resistance-measurement signal is connected at the moment, for example a corresponding pressure threshold value or a corresponding resistance threshold value as a basis for comparison, and the two test signals which arrive sequentially and relate to a single chamber are stored on an intermediate basis for subsequent evaluation, as can be done without difficulty.

Figure 3:
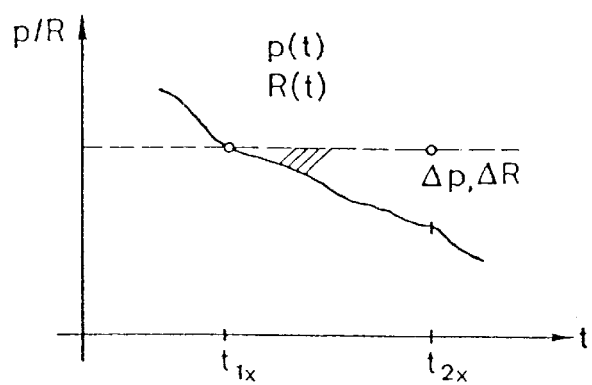
FIG. 3 shows an example of the time curve of the test pressure or test resistance and a preferred procedure for signal evaluation.

In W094/05991 of the same applicant as the present invention, a procedure for pressure testing is described that allows the resolution obtained to be drastically increased, in other words very small leaks can be detected. In this regard, express reference is made to the contents of this document. In FIG. 3, the principle described in the abovementioned WO is shown briefly and it is explained how this is integrated into the system that forms the basis of this application.

Below time axis t in FIG. 3 the curve of a recorded pressure or of a resistance value $R_x$ recorded in measurement sections $11_x$ is shown. This curve is to be understood as purely qualitative. Basically, the presence of a leak means that a vacuum produced in the test chamber decreases too sharply with time, because pressure equalization between the interior of the container and the volume of the test chamber takes place, while a filling liquid escaping through a leak usually causes a decrease in the detected resistance directly at the container wall. According to FIG. 3, following the principle explained above, at each chamber of stations $1_x$ at a first point in time $t_{1x}$, the pressure value or the resistance value which then prevails is recorded. This signal value is stored and supplied on the evaluation unit, to both inputs of a differential-forming unit provided therein. Under ideal compensation conditions, on the output side of the differential-forming unit and following amplification, the signal "zero" should appear. A signal that differs from zero is interpreted as a zero point deviation and likewise stored. At a second subsequent point in time $t_{2x}$, another pressure or resistance value is recorded. The value recorded at the second point in time is compared with the one recorded and stored at the first point in time, with the likewise detected zero point deviation signal being taken into account depending on the sign before it. The comparison result $\Delta_p$ or $\Delta_R$ can now be evaluated with high amplification without error. If this procedure is performed using the system according to FIG. 1 or FIG. 2, as is readily apparent, the provided measurement sections, whether they are the pressure sensor and/or the impedance measurement sections, are scanned sequentially at first and second points in time, with this being performed by appropriately controlling the multiplexers provided. It is not necessary under these conditions that the scans be performed immediately following one another according to $t_{1x}$ and $t_{2x}$ in FIG. 3. Depending on the optimization of the time ratios, for example, all the $t_{1x}$ values can be recorded first, and stored accordingly, and then all the $t_{2x}$ values for evaluation.

In this case also, the entire evaluation can be performed using a single evaluation unit whose input is supplied with the pressure and impedance values that were interrogated on a time sequence basis. In this manner, even more complex interrogation rhythms and correspondingly high leakage resolutions can be accomplished with a single evaluation unit and a multiplexer unit connected upstream from it.

I claim:

1. A method for producing unleaky containers comprising:

manufacturing a plurality of closed containers;

providing a number of leak test stations, each for at least one container, on a movable conveyor wherein the test stations move with the conveyor;

loading said stations with said closed containers;

generating an electric signal output on the movable conveyor at each of said stations in dependency of leakage of said container under test in a station considered and applying the electric output signals of said stations subsequently, one after the other to an input of a common evaluation unit on said movable conveyor and generating by said common evaluation unit leak indicative signals for each of said containers under test; and rejecting containers indicated by said leak indicative signals to be leaky.

2. The method according to claim 1, wherein said generating an electric signal output at each of said stations in dependency of leakage of said container under test in a station considered includes performing a pressure measurement on the movable conveyor at the respective test stations.

3. The method according to claim 2, wherein both pressure measurement and an electrical impedance measurement are performed on the movable conveyor at each of said stations.

4. The method according to claim 3, wherein the output signals of said stations from said pressure measurements and the output signals of said stations from said impedance measurements are applied to said input of said common evaluation unit on a time-staggered basis.

5. The method according to claim 3, wherein the output signals of said stations from said pressure measurements and the output signals of said stations from said impedance measurements are applied to respective ones of different common evaluation units on said conveyor.

6. The method according to claim 1, wherein a plurality of containers are loaded at each of the leak test stations.

7. The method according to claim 6, wherein the container loaded at each of the leak test stations are a set of ampoules.

8. The method according to claim 6, wherein a leak in is one of a plurality of containers at a leak test station results in rejection of the entire plurality.

* * * * *